Figure 1:
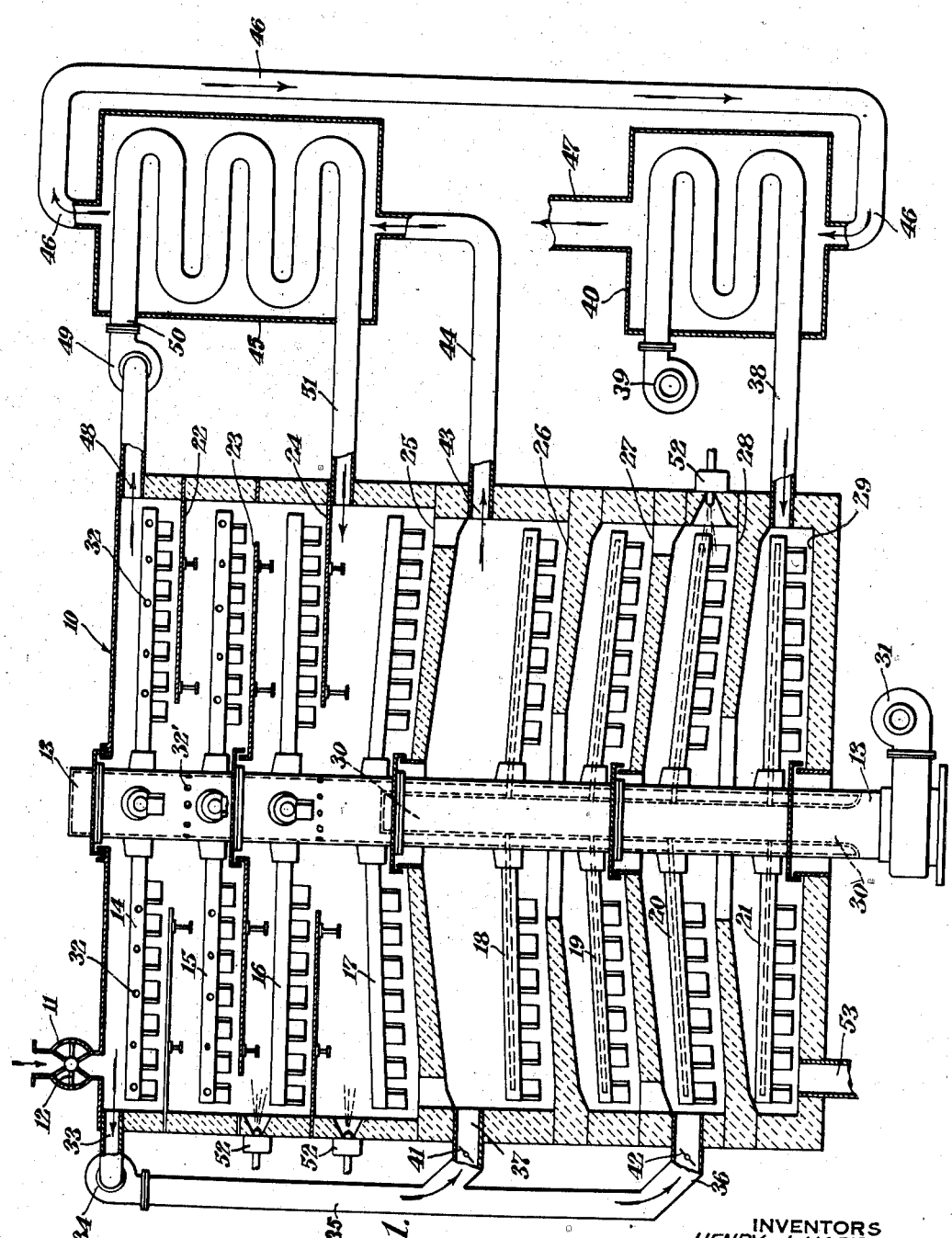

Jan. 16, 1940.    H. J. HARTLEY ET AL    2,187,201
INCINERATION OF SEWAGE SLUDGE OR THE LIKE WASTE MATERIALS
Filed April 10, 1936    3 Sheets-Sheet 1

INVENTORS
HENRY J. HARTLEY
DUDLEY BAIRD
BY
Ward Crosby & Neal
ATTORNEYS

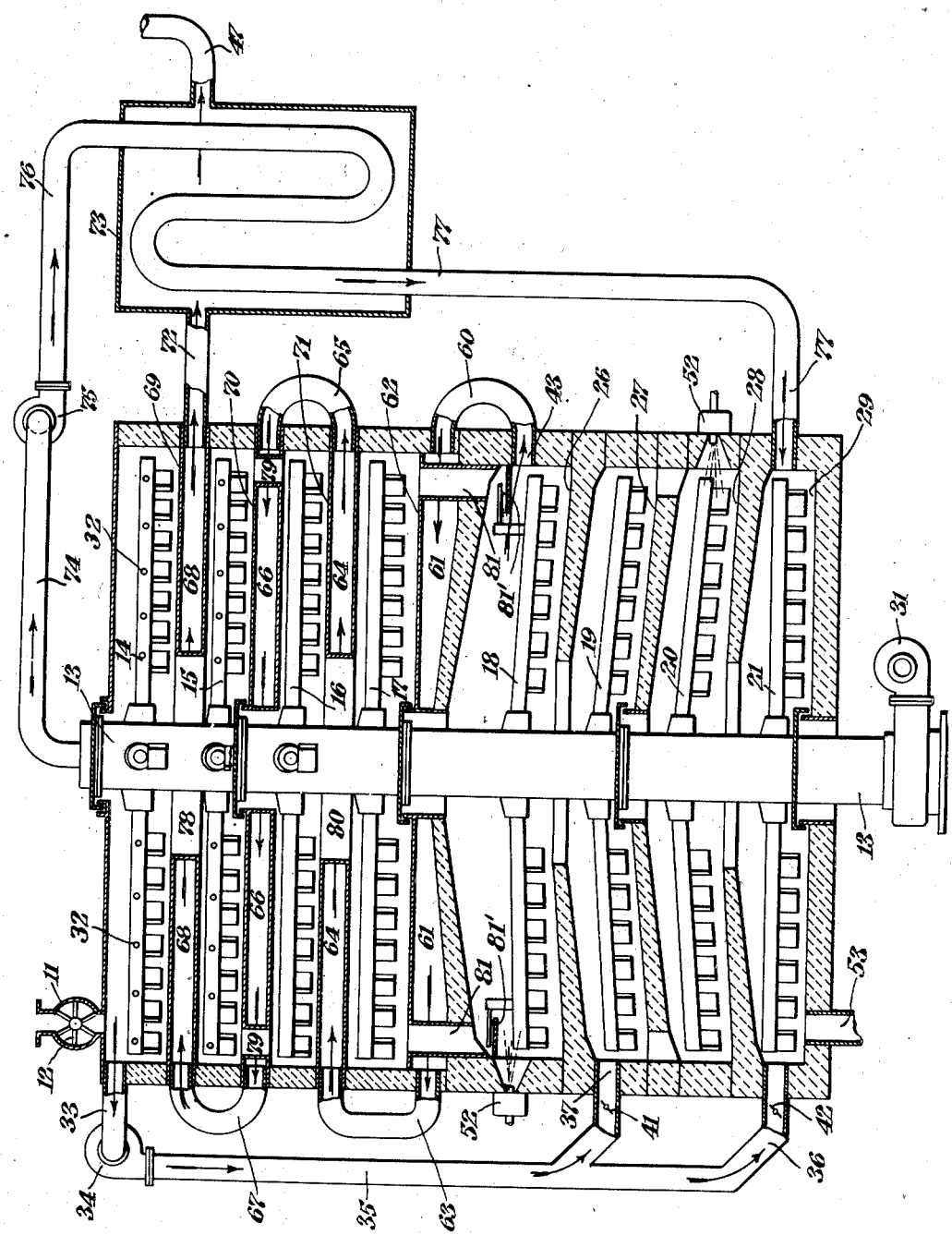

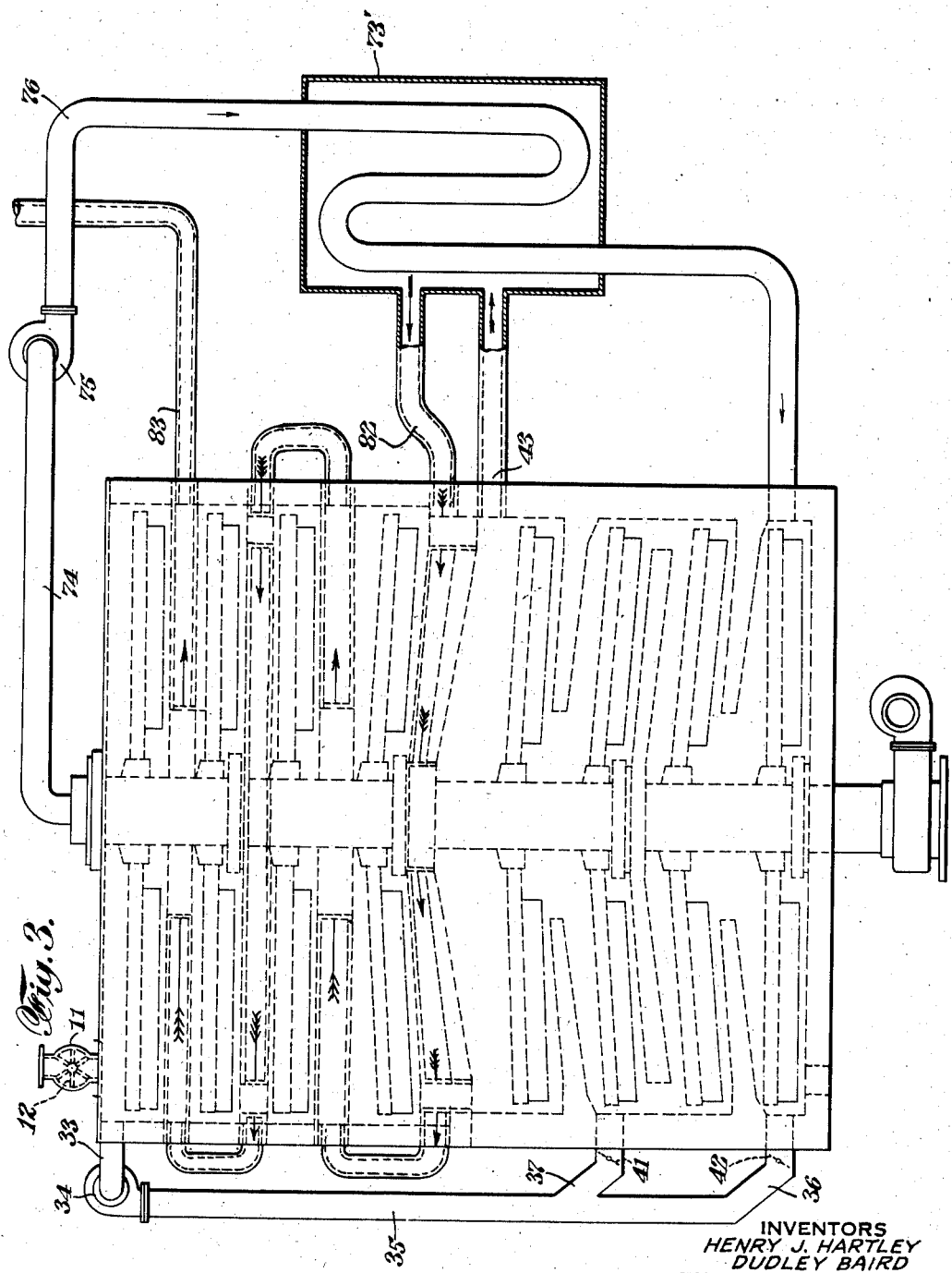

Patented Jan. 16, 1940

2,187,201

UNITED STATES PATENT OFFICE 2,187,201

INCINERATION OF SEWAGE SLUDGE OR THE LIKE WASTE MATERIALS

Henry J. Hartley, Hastings on Hudson, N. Y., and Dudley Baird, Berkeley, Calif., assignors to Nichols Engineering & Research Corporation, New York, N. Y., a corporation of Delaware Application April 10, 1936, Serial No. 73,620

18 Claims. (Cl. 110—12)

This invention relates to methods and apparatus for incinerating sewage sludge or the like waste materials and embodies various improvements and modifications of the method and apparatus of the patent to Dudley Baird and Robert W. Rowen, No. 2,015,050, granted September 17, 1935.

This invention according to one of its phases is directed to economizing features permitting the elimination or substantial elimination of the use of extraneous fuel in the incineration of sewage sludge or the like material, even in cases where the sludge embodies a substantial water content. Other features of the invention are directed to the efficient and thorough elimination of odor from the gases and vapors evolved from the drying of the sewage sludge, as well as from the gases evolved during the incineration of the material.

Various further and more specific objects, features and advantages will clearly appear from the detailed description given below taken in connection with the accompanying drawings which form a part of this specification and illustrate merely by way of example preferred forms of the apparatus of the invention.

The invention consists in such novel features, arrangements and combinations of parts as may be shown and described in connection with the apparatus herein disclosed, and also such novel methods and combinations of method steps as are disclosed and described herein.

In the drawings, Fig. 1 illustrates one form of apparatus embodying the invention and in which the method of the invention may also be carried out;

Fig. 2 illustrates an alternative embodiment of the invention; and

Fig. 3 schematically illustrates a further modification of the invention.

As explained in the above mentioned Patent No. 2,015,050, sewage sludge as produced in sewage treatment plants may first be passed through a suitable filter or other dewatering equipment to provide a solid or semi-solid filter cake or the like having a moisture content ranging from in the neighborhood of 50–60% up to 85%, for example. In most cases a sewage sludge filter cake having a moisture content of in the neighborhood of 70% may be readily obtained, although of course the invention may be used to incinerate a cake having a lower or higher moisture content.

After a substantial portion of the moisture has been thus eliminated, the sludge may be conveyed to the top of the multiple hearth furnace, such as shown at 10, and introduced therein through a suitable inlet feeding device 11 designed to more or less continuously admit the sludge into the top of the furnace and at the same time serving to seal the inlet opening against escape of gases at this point. In the particular form shown the feeding device 11 may include a revolving member 12 having a number of vanes forming pockets for receiving the sludge and delivering it to the furnace and at the same time serving to seal off the inlet against escape of gases.

The multiple hearth furnace 10 may comprise a rotatable hollow central shaft 13 extending vertically up through the middle of the furnace and carrying a plurality of rabble arms as at 14 to 21 inclusive for rabbling the material in succession over the superposed hearths 22 to 29 respectively. It will be understood that alternate hearths such as hearths Nos. 22, 24, 26 and 28 may be provided with central discharge openings, whereas the remaining hearths may be formed with peripheral discharge openings whereby the material may be rabbled inwardly and outwardly of alternate hearths respectively and down through the furnace while being first dried and then incinerated. The entire furnace structure may be enclosed within a cylindrical wall in the usual manner.

In the particular example shown, hearths Nos. 25 to 29 may be constructed of brick or the like in the usual manner. At least the greater part of the incineration will occur on these hearths and accordingly they are constructed in a manner to resist high temperatures. On the other hand, the greater part of the drying of the sludge may occur on hearths Nos. 22, 23 and 24 and these hearths may be constructed of a suitable heat resistant alloy steel to facilitate the efficient transmission of heat from the hearths below, into the under side of the layers of sludge on each drying hearth, whereby the drying may proceed more efficiently and rapidly.

The central shaft 13 may be provided with an internal conduit 30 receiving air from a blower or the like at 31 and conducting such air into internal conduits within rabble arms 18 to 21, inclusive (and also arms 16 to 21 if desired), in a manner similar to the cooling conduit arrangement in the shaft and rabble structure of the above mentioned Patent No. 2,015,050. That is, the cooling air may pass up through the internal shaft conduit 30, then through the internal conduits of the lower rabble arms to the ends of such arms and back through the outer annular spaces in the rabble arms to the annular space within shaft 13 exteriorly of conduit 30. The cooling air upon reaching such annular space, will of course be substantially preheated and this preheated air may be conducted through the upper part of shaft 13 and out through rabble arms as at 14 and 15 at hearths Nos. 22 and 23. These latter rabble arms may be provided with small spaced air outlets as at 32 for discharging the preheated air on to the upper hearths. Similar openings as at 32' if desired may also be provided through the walls of the central shaft at various points in the region of the upper hearths. Thus a supply of fresh relatively dry hot air is provided for efficiently drying the sludge on the upper hearths and this air is discharged at points adjacent each of the rabble teeth on these hearths so that as the rabble teeth expose new surfaces of the sludge material, such surfaces will promptly meet with streams of the dry hot air.

In the particular construction shown, the three upper hearths are each indicated as provided with four rabble arms in order to insure frequent rabbling of the relatively bulky wet material being dried on these hearths. On the other hand, the lower hearths are shown as provided with but a single pair of rabble arms so that the sludge material being incinerated on the lower hearths will rest for a somewhat longer period on each hearth to enable thorough incineration. It will of course be understood that a greater or lesser number of the drying hearths and incinerating hearths may be provided, depending upon the particular conditions met with in each installation, and the ratio of the number of drying hearths to the number of incinerating hearths may be altered to suit various conditions.

In the construction shown, as the material is rabbled over the various hearths down through the furnace, it comes in contact with a countercurrent stream of gases and vapors rising over the various hearths and up through the furnace through the various discharge ports of the several hearths. This stream of air, gases or vapors may be derived at the bottom of the furnace from either one or both of two sources, i. e., first, moisture-laden gases from the top hearth may be withdrawn through an outlet 33 by a blower 34 and conducted through conduits 35, 36 and 37 into one or more of the hearth areas at the lower part of the furnace. Secondly, if desired fresh air may be admitted into the lower part of the furnace through a conduit 38, this air coming from a blower 39 and being preheated if desired by passing through a recuperator or other heat exchanging device 40 as hereinafter further explained. The delivery of the gases from conduit 35 to the lower part of the furnace may be controlled by dampers as at 41 and 42 so that all or any desired portion of the gases withdrawn from the top hearths may be introduced into the bottom hearth area, or if desired, into an upper incinerating hearth or hearths, such for example as the second or third hearth from the bottom.

The gases and vapors are preferably finally withdrawn from the furnace through an exit opening 43 located at one of the middle hearths of the furnace preferably at a hearth where the incineration temperatures are the highest. This will insure that the gases and vapors before being withdrawn from the furnace will be subjected to the highest temperature available in the furnace to thoroughly eliminate odors from such gases. From the outlet 43 the gases may be conducted through a conduit 44 to a recuperator or through heat interchanging device 45, thence through conduit 46 to the above mentioned recuperator 40 and finally to a conduit 47 connected to a waste heat boiler or stack.

It will be noted that the intake air for the equipment entering at blowers 31 and 39 and the gases and vapors which accumulate with such air within the furnace, must, in traveling through the apparatus, pass through a relatively large number of extended passageways and tortuous cavities, which would normally impose considerable resistance against the flow of such air and gases. If it were attempted to apply sufficient initial pressure to the intake air to overcome this resistance, at least some portions of the interior of the furnace would be subjected to substantial gas pressures sufficient to cause the escape of odoriferous gases through inspection doors, etc. With the arrangement shown, however, this danger is eliminated through the use of the several blowers as at 34 and 49 cooperating with the blowers 31 and 39 and the suction from the stack connected at 47 so as to apply force to the gases, vapor and air at a plurality of points for imparting the desired motion to the gases, etc., at the intakes and at the final outlet as well as between the various units of the apparatus. Thus the force applied to the gas is distributed rather than being concentrated, and objectionable pressures at any one point in the system may be readily avoided.

The recuperator or other heat interchanging device 45 may be arranged to transfer substantial quantities of heat from the exit gases of the furnace to the gases and vapor circulating over the upper drying hearths of the furnace. That is, a part of the gases and vapor may be withdrawn through a conduit 48 from a zone or zones near the top of the furnace, circulated by a blower 49 through conduit 50, recuperator 45, conduit 51, back to one of the lower drying hearth areas. Thus waste heat from the furnace exit gases is used to insure a desired high temperature at the drying hearths. At the same time the blower 49 causes a substantial part of the gases and vapors occurring over the drying hearths to be recirculated over these hearths so that such gases may efficiently absorb substantially the maximum possible amount of moisture before they are withdrawn by blower 34 and reintroduced at the incinerating hearths for heat treatment to eliminate odors therefrom before they leave the furnace. Thus, with this arrangement the introduction of excessive quantities of air into the drying hearths may be avoided. It will be appreciated that with equipment of this kind, it is desirable to minimize the intake of air into the various hearths of the furnace because any excess of air requires further heat to bring the resulting larger volume of air and gas mixture up to a temperature sufficient to destroy odors in the mixture and to maintain the proper drying and incineration conditions in the furnace. In fact, if desired, the introduction of air into the drying hearths as through openings 32, may be substantially eliminated, as is the case with the similar embodiment of the invention hereinafter described in connection with Fig. 2. In that event of course, fluid flowing through conduit 35 will to a large extent comprise merely hot vapors and gases evolved from the material on the drying hearths and the intake conduit 38 will provide the necessary supply of air to maintain proper combustion at the incinerating hearths. The branch conduit 37 enables the vapor and gases from the drying hearths to be passed over the hot incineration hearth 26 before their exit from the furnace if desired, without introducing such vapor into the lower hearths where it might tend to interfere with the desired final thorough incineration of the sludge.

The gases discharged from the furnace through outlet 43 to the recuperator 45 may be at a temperature in the neighborhood of 1100° F. or higher, which is sufficient to decompose and destroy any odoriferous content of such gases. A substantial quantity of the heat of these gases will be absorbed in the recuperator 45, but they will still contain some useful heat upon their passage into recuperator 40. And a substantial portion of this remaining heat may be utilized in the recuperator 40 to preheat the gases admitted through conduit 38 to the lower part of the furnace.

Thus by the time gases and vapors from the furnace pass out of recuperator 40, most of the useful heat thereof will have been absorbed and efficiently utilized. The gases leaving recuperator 45 through connection 46 may for example by at a temperature of 700–800° F. and the gases leaving the recuperator 40 through outlet 47 may be at a temperature of 400–500° F., for example.

The above described equipment makes possible such a high degree of economy in the utilization of the heat value of the sludge being treated, that in most cases the equipment may be operated without the use of extraneous fuel. Thus over a period of time very substantial savings in the expense of operation are made possible as compared with any equipment for the purpose heretofore devised. While with the equipment of the above mentioned Patent No. 2,015,050 the incineration operations may, by careful regulation when the sludge is not too wet, be operated at times without extraneous fuel, the equipment of the present invention may be safely operated over long periods without added fuel and without danger of odors in the exit gases. However, for initially bringing the furnace up to operating temperatures and for providing the necessary heat in case unusually wet sludge is being treated, several oil or gas burners as at 52 may be provided at various hearths, as shown.

The ash resulting from the incineration of the sewage sludge may be finally passed out through a discharge opening 53 at the bottom of the furnace.

Various of the principles of operation and construction of the embodiment of the invention illustrated in Fig. 2 are the same as with the arrangement of Fig. 1. However, instead of using the high temperature recuperator 45 of Fig. 1, the arrangement in Fig. 2 provides for conducting the hot gases from outlet 43 through a duct 60 and into a cavity 61 where the hot gases are brought into heat interchanging relationship with hearth 62 and the material thereon. From cavity 61 the hot gases may be conveyed in succession through various ducts and hearth cavities 63 to 68 inclusive, whereby upper hearths 69, 70, 71 and 62 are all muffle heated. From cavity 68 the hot gases may be conducted through conduit 72 to a recuperator 73, thence to an outlet 47 running to a stack or other means of disposal of the relatively cooled gaseous products of combustion.

Instead of discharging all the air from the rabble arm cooling conduits directly into the furnace as in Fig. 1, we have illustrated in Fig. 2 a rabble arm shaft arrangement corresponding more closely to that of the above mentioned Patent 2,015,050. That is, the rabble arm cooling air from the blower 31 after passage through cooling conduits of the rabble arm and shaft structure, may pass out through a conduit 74 connected to the top of the shaft, thence through a blower 75 and conduit 76 through the recuperator 73 and conduit 77 into the lower part of the furnace, thus supplying a source of preheated air for maintaining combustion in the furnace. This air, it will be noted, is first preheated by passing through the rabble structure and then further preheated by being brought into heat interchanging relationship with the gaseous products of combustion from the furnace in recuperator 73. The arrangement of Fig. 2 may be provided with conduits 33, 35, 36, 37 and blower 34, as in Fig. 1, for conducting moisture-laden gases from the upper part of the furnace down and into the lower part of the furnace where such gases are raised to a high temperature sufficient to eliminate odors therefrom before they are discharged through outlet 43. In Fig. 2 as in Fig. 1, some hot air may be readily discharged through outlets as at 32 in the rabble arms onto the drying hearths if desired.

It will be understood that the upper muffle heated hearths of Fig. 2 may be provided with discharge ports as at 78 to 81 inclusive, for permitting the drying or dried sludge to fall from hearth to hearth. The openings 81 are preferably made relatively small or else are provided with suitable luting means, so that at least the major part of the hot gases from the incinerating hearths will be conveyed through the conduit 60 and succeeding cavities connected therewith instead of passing directly up in contact with the sludge being dried on the upper hearths. Suitable luting means for hearth discharge ports of this type are well known, as shown in our Patents Nos. 1,879,680, 1,640,988 and 1,671,395, and one example is here illustrated in Fig. 2 at 81'. The corresponding openings between the drying hearths and incinerating hearths in the similar embodiment of Fig. 1, i. e., at hearth 25, may also if desired be provided with suitable luting means.

The arrangement schematically shown in Fig. 3 may be similar to that shown in Fig. 2, with muffle heated upper hearths, except that the recuperator 73' is supplied with hot gases directly from the outlet 43 at one of the upper incinerating hearths and such gases after passing through this recuperator, may be introduced into the lower muffle hearth cavity through conduit 82. In this case, the muffle cavities serve to bring the gaseous products of combustion from conduit 82 directly into heat interchanging relationship with the stream of gases and vapors passing over the material on the drying hearths. After such gases pass through the various muffle hearth cavities, they may be withdrawn through conduit 83 from near the top of the furnace.

It will thus be observed that in each of the above constructions novel means are provided for economizing in the use of the heat available, with the consequence that in most cases the use of extraneous fuel may be avoided. This in a large measure is accomplished through economical absorption, in two stages, of heat from the exit gases of the furnace, which heat might otherwise be wasted, and through the use of arrangements for recirculating the gases through the drying zones of the furnace to insure that such gases will absorb a relatively high percentage of moisture before they are passed out of the furnace, thus rendering it unnecessary to heat such a large quantity of incoming air as would otherwise be required. Furthermore in each of the above described arrangements, means are provided for circulating the moisture-laden gases arising from the drying zones, through a high temperature incinerating zone before the gases are passed out of the furnace, thus insuring complete elimination of odors therefrom—i. e., not only the odors arising during incineration, but also any odors occurring in the vapors produced in the drying zones. All of the gases as thus brought out from the incinerating zone are also at such a high temperature that they may be economically used to preheat the fresh incoming air to a relatively high temperature.

As shown in Figs. 1, 2 and 3 the drying portion of the furnace is an integral part of the incinerating portion. These two portions could be separated and means provided for transferring the dried or partially dried sludge from the drier to the incinerator. A drier of suitable design other than the multiple hearth type shown might readily be used and the operations carried on in a similar manner. Alternative embodiments of the invention are described and claimed in applicants' copending applications Ser. No. 95,950, filed August 14, 1936, now Patent No. 2,121,661, and Ser. No. 96,576, filed August 18, 1936, now Patent No. 2,121,662.

While the invention has been described in detail with respect to certain particular preferred examples which give satisfactory results, it will be understood by those skilled in the art, after understanding the invention, that various changes and modifications may be made without departing from the spirit and scope of the invention, and it is intended, therefore, in the appended claims to cover all such changes and modifications.

What is claimed as new and is desired to be secured by Letters Patent of the United States is:

1. The process of drying and incinerating sewage sludge to form an ash substantially free of organic matter and evolved gases free of noxious odor, which comprises treating the sludge to remove a substantial percentage of the moisture content thereof, then passing the sludge material downwardly through a plurality of superposed zones, temporarily retaining said material in layers at each of said zones while periodically agitating it and causing it to be broken into fine pieces and maintaining it in finely divided condition while advancing it through each zone and gradually from zone to zone in the presence of streams of hot gases and air, subjecting the finely divided material at an intermediate zone or zones to a high temperature sufficient to substantially eliminate the organic matter therefrom, heat from said intermediate zone or zones being conveyed by hot gases therefrom flowing into contact with the material in the upper zone or zones for drying the material in said higher zone or zones, and withdrawing gases and vapor from said upper zone or zones and reintroducing the same into said high temperature zone or zones, whereby such withdrawn gases and vapor resulting from drying the material at the upper zone or zones are subjected to a temperature sufficient to substantially eliminate noxious odors therefrom.

2. The process of drying and incinerating waste material without the use of extraneous fuel, which comprises treating the material to mechanically remove a substantial percentage of the moisture content thereof, then passing the material successively through a plurality of zones wherein the material is first dried, and then incinerated in the presence of streams of hot gases, withdrawing the hot gaseous products of the process from a high temperature zone of incinertion, bringing such hot gaseous products into heat interchanging relationship with the drying zones, thereafter bringing such gaseous products into heat interchanging relationship with a source of air supplied to the zones of incineration, and withdrawing moisture-laden gases from the zones of drying and introducing the same into a high temperature zone of incineration whereby noxious odors of the moisture-laden gases are destroyed.

3. Apparatus for drying and incinerating sewage sludge material, comprising a furnace having a plurality of superposed hearths, including a top hearth or hearths for drying and a lower hearth or hearths for incinerating the material, an inlet at the top of said furnace provided with means for substantially continuously feeding the sludge material into the top of said furnace, rabbling means provided with teeth cooperating with each of said hearths for periodically agitating and advancing the sludge material over each hearth and gradually from hearth to hearth down through the furnace, said rabbling means embodying conduits for conveying cooling air therethrough, means for introducing such cooling air into said conduits for passage first through the rabbling means at said incinerating hearths whereby such air becomes preheated and for then conveying such air into the rabbling means at said drying hearths, the rabbling means at said drying hearths being formed with one or more outlets permitting such preheated air to be discharged on to the material being dried, means for withdrawing moisture-laden gases from the drying hearths and reintroducing such gases at an incinerating hearth, means for withdrawing gaseous products of combustion from the region of a high temperature incinerating hearth, and means for thereafter bringing said products of combustion into heat interchanging relationship with gases circulating over the drying hearths and with air introduced into said incinerating hearths.

4. Apparatus for drying and incinerating sewage sludge material, comprising furnace means having a zone or zones for drying the material and another zone or zones for thereafter incinerating the material, means for circulating gases and vapor through the drying zones, rabbling means for advancing the material through said incinerating zones, said rabbling means having air cooled conduits, means for projecting jets of air preheated by passage through said conduits onto the material being dried in said drying zones, means for withdrawing moisture-laden gases from said drying zones and introducing the same into regions of high temperature at said incinerating zones, means for withdrawing gaseous products of combustion from a high temperature incinerating zone, and means for utilizing the heat of said products of combustion to heat the gases and vapor circulating in said drying zones and to preheat a source of air supply for said incinerating zones.

5. Apparatus for drying and incinerating waste material comprising a furnace having a plurality of superposed hearths including a top hearth or hearths for drying and lower hearths for incinerating the material, rabbling means cooperating with each hearth for periodically agitating and advancing the material over each hearth in succession and gradually from hearth to hearth down through the furnace, means for conveying vapor evolved from the drying material, from said drying hearth or hearths and introducing the same at an incinerating hearth adjacent the bottom of the furnace, means for causing such vapor together with gaseous products of combustion from the burning material to pass upwardly in succession over the incinerating hearths, exit means at an upper incinerating hearth for said vapor and gaseous products, and a pair of heat exchanging devices with connections whereby the exit gases and vapor pass therethrough in succession, one of said devices being connected to transfer heat to said vapor prior to its introduction to the incinerating hearths and the other of said devices being connected to preheat a supply of intake air for the furnace.

6. Apparatus for drying and incinerating waste material comprising a furnace having a plurality of superposed hearths including one or more upper drying hearths and a plurality of lower incinerating hearths, rabbling means for cooperating with each hearth for periodically agitating and advancing the material over each hearth in succession and gradually from hearth to hearth down through the furnace, means for conducting vapor evolved from the material at the drying hearth or hearths, from said hearth or hearths and introducing such vapor at a lower incinerating hearth of the furnace, means for causing said vapor together with evolved gases from the burning material to pass countercurrent to said material on the incinerating hearths, thence from the furnace at an upper high temperature incinerating hearth, whereby said vapor and gases before their exit are subjected to a high temperature for substantial elimination of noxious odors therefrom, means for introducing intake air into the furnace, means for bringing the high temperature exit vapor and gases into heat exchanging relationship, first with said vapor before its introduction to the incinerating hearths, and then with said intake air.

7. Apparatus for drying and incinerating waste material comprising a furnace having a plurality of superposed hearths including a top hearth or hearths for drying and lower hearths for incinerating the material, rabbling means cooperating with each hearth for periodically agitating and advancing the material over each hearth in succession and gradually from hearth to hearth down through the furnace, means for conveying vapor evolved from the drying material, from said drying hearth or hearths and introducing the same at an incinerating hearth, exit means at an incinerating hearth and at a point spaced from the point of intake of said vapor whereby said vapor and gaseous products of combustion from the burning material may be withdrawn from the furnace after passage over a high temperature incineration hearth, and a pair of heat exchanging devices with connections whereby the exit gases and vapor pass therethrough in succession, one of said devices being connected to transfer heat to said vapor prior to its introduction to the incinerating hearth and the other of said devices being connected to preheat a supply of intake air for the furnace.

8. The process of drying and incinerating waste material which comprises passing the material through a drying zone in the presence of a stream of heated air and then through an incinerating zone also in the presence of a stream of heated gases including air, withdrawing hot gaseous products of combustion from the incineration zone and bringing such gaseous products into heat interchanging relationship first with the air entering the incineration zone and then into heat interchanging relationship with the stream of air for the drying zone.

9. The process of drying and incinerating waste material which comprises passing the material through a drying zone in the presence of a stream of heated air and then through an incinerating zone also in the presence of a stream of heated gases including air, withdrawing hot gaseous products of combustion from the incineration zone and bringing such gaseous products into heat interchanging relationship first with the air entering the incineration zone and then into heat interchanging relationship with the stream of air for the drying zone, and also conducting the vapor evolved from the material in the drying zone into and through the incinerating zone for destruction of odors of such vapor.

10. The process of drying and then incinerating waste material which comprises first treating the material to remove a substantial percentage of the moisture thereof, then passing the material successively through a plurality of drying zones, temporarily retaining said material as a layer in each of said drying zones while periodically agitating it and while it is being advanced through each zone and gradually from zone to zone, then passing the material into an incinerating zone, and passing hot gaseous products of combustion from the incinerating zone through said drying zones in succession in contact with the drying material therein, withdrawing gases and vapor evolved from the material in said drying zones and introducing such withdrawn gases and vapor into said incinerating zone for the destruction of odors of such gases and vapor.

11. Apparatus for drying and incinerating waste material, comprising a plurality of superposed drying hearths, means for feeding the material onto the upper one of said hearths, means cooperating with each hearth for agitating and advancing the material over each hearth and gradually from hearth to hearth, said drying hearths being formed with muffle heating cavities, incinerating means for receiving and burning the dried material, conduit means for conducting vapor evolved from the drying material from said drying hearths into said incinerating means whereby such vapor is subjected to temperatures sufficient to destroy obnoxious odors thereof, a heat exchanging device, means for conducting the supply of air for supporting combustion through said device into said incinerating means, and means for withdrawing hot gaseous products of combustion from the incinerating means and conducting such products through said muffle heating cavities, and thence through said device in heat exchanging relationship with said air supply.

12. Apparatus for drying and incinerating sewage sludge, which comprises a furnace having a plurality of superposed hearths including an upper hearth or hearths for drying the sludge and a lower hearth or hearths for incinerating the same, rabbling means cooperating with each hearth for agitating the sludge and gradually advancing the same over each hearth and downwardly from hearth to hearth, a heat exchanging device, means for withdrawing vapor evolved at the drying hearth or hearths and passing such vapor through said device and thence back into contact with the sludge on said drying hearth or hearths for recirculation over the drying sludge, means for withdrawing hot gaseous products of combustion from the furnace through a high temperature incineration hearth and passing such products through said device in heat exchanging relationship with said vapor to heat said vapor, and further means for withdrawing vapor from said drying hearth or hearths and introducing the same over the burning sludge on the incinerating hearth or hearths to destroy noxious odors of such vapor.

13. Apparatus of the class described comprising a tiered multiple-hearth furnace having a plurality of vertically spaced hearths extending across the furnace and having outlets through which material introduced at the top of the furnace may pass downwardly to the lowermost hearth and then be discharged from the furnace, means at the outlet of an intermediate hearth to prevent the passage of gas through said intermediate hearth and divide the furnace into an upper drying section and a lower burning section, the hearths of the drying section being hollow and of material having relatively high heat conductivity, means for supplying air to the drying section, means for conducting gases and vapors from the drying section to the burning section, and means for conducting hot exhaust gases of combustion from the burning section through the hollow hearths of the drying section for heating the material and gases passing through the drying section.

14. Apparatus of the class described comprising a tiered multiple-hearth furnace having a plurality of vertically spaced hearths extending across the furnace to divide it into compartments and having outlets through which material introduced at the top of the furnace may pass downwardly to the lowermost hearth and then be discharged from the furnace, means at the outlet of an intermediate hearth to prevent the passage of gas through said intermediate hearth and divide the furnace into an upper drying section and a lower burning section, the hearths of the drying section being hollow and of material having relatively high heat conductivity, means for conducting gases and vapors from the drying section to the burning section, means for conducting hot exhaust gases of combustion from the burning section through the hollow hearths of the drying section for heating the solids and gases therein, and rabbling means for feeding the material over said hearths to their outlets, said rabbling means including a hollow vertical shaft receiving air at its lower end and having suitable openings to supply air to the compartments of the drying section.

15. Apparatus of the class described comprising a multiple-hearth furnace having a plurality of vertically spaced hearths extending across the furnace and having outlets through which material introduced at the top of the furnace may pass downwardly to the lowermost hearth and then be discharged from the furnace, means at the outlet of an intermediate hearth to prevent the passage of gas through said intermediate hearth and divide the furnace into an upper drying section and a lower burning section, the hearths of the drying section being hollow and of material having relatively high heat conductivity, means conducting gases and vapors from the drying section to the burning section, means for conducting hot exhaust gases of combustion from the burning section through the hollow hearths of the drying section before discharge from the furnace, and means for discharging from the furnace hot exhaust gases of combustion in the burning section.

16. Apparatus of the class described comprising a tiered multiple-hearth furnace having a plurality of vertically spaced hearths extending across the furnace and having outlets through which material introduced at the top of the furnace may pass downwardly to the lowermost hearth and then be discharged from the furnace, means at the outlet of an intermediate hearth to prevent the passage of gas through said intermediate hearth and divide the furnace into an upper drying section and a lower burning section, the hearths of the drying section being hollow and of material having relatively high heat conductivity, the hollow hearths of said drying section being connected in series, means for conducting gases and vapors from the drying section to the burning section, and means for supplying hot gases of combustion in said burning section to the lowermost of said hollow hearths.

17. Apparatus for treating material which comprises means for passing the material downwardly from zone to zone through a plurality of superposed zones, means for retaining the material temporarily in each zone, means for preventing the direct flow of gases between an upper drying group of zones and a lower burning group of zones, means for preheating air by bringing it into heat exchanging relationship with hot gases in the burning group, means for passing the air thus preheated into the zones of said drying group, means for heating the material and gases in the drying group of zones by bringing into heat interchanging relationship therewith hot gaseous products passing from the burning group of zones to the atmosphere, and means for passing gases and vapors from the drying group of zones to the burning group of zones.

18. Apparatus for destroying wet sewage sludge comprising in combination an enclosed chamber, a series of superposed hearths having agitating means thereon and constructed and arranged to provide a closed passage extending successively over said hearths from the lower portion to the upper portion of said chamber, means for delivering wet sludge to the upper hearth in said chamber, said means being closed against the escape of fumes and gases to the atmosphere, means for introducing heated gaseous products of combustion into the lower portion of said passage and causing the same to counterflow over the sludge, means for introducing relatively dry heated gases into said passage at a plurality of points along the passage and means for introducing the gases from the upper part of said chamber into the lower part of said chamber and subjecting them to temperatures high enough to destroy the noxious odors in said gases.

HENRY J. HARTLEY.
DUDLEY BAIRD.